(12) United States Patent
Davies (10) Patent No.: US 10,547,841 B2
(45) Date of Patent: Jan. 28, 2020

(54) ADAPTIVE MULTI-SYMBOL ARITHMETIC CODING USING MULTI-SYMBOL ALPHABETS INCLUDING MAGNITUDE TOKEN LEVELS AND END-OF-BLOCK (EOB)

(71) Applicant: Cisco Technology, Inc., San Jose, CA (US)

(72) Inventor: Thomas J. Davies, Guildford (GB)

(73) Assignee: Cisco Technology, Inc., San Jose, CA (US)

( * ) Notice: Subject to any disclaimer, the term of this patent is extended or adjusted under 35 U.S.C. 154(b) by 67 days.

(21) Appl. No.: 15/624,915

(22) Filed: Jun. 16, 2017

(65) Prior Publication Data

US 2018/0167617 A1    Jun. 14, 2018

Related U.S. Application Data (60) Provisional application No. 62/431,537, filed on Dec. 8, 2016.

(51) Int. Cl.
| | |
|---|---|
| *H04N 19/13* | (2014.01) |
| *H04N 19/70* | (2014.01) |
| *H04N 19/169* | (2014.01) |
| *H04N 19/184* | (2014.01) |
| *H04N 19/65* | (2014.01) |

(52) U.S. Cl.
CPC ........... *H04N 19/13* (2014.11); *H04N 19/169* (2014.11); *H04N 19/184* (2014.11); *H04N 19/65* (2014.11); *H04N 19/70* (2014.11)

(58) Field of Classification Search
CPC ....... H04N 19/13; H04N 19/91; H04N 19/169
See application file for complete search history.

(56) References Cited

U.S. PATENT DOCUMENTS

| | | |
|---|---|---|
| 5,774,081 A | 6/1998 | Cheng et al. |
| 7,206,448 B2 | 4/2007 | Howard |
| 7,353,233 B1 * | 4/2008 | Ganca ................... H04N 19/91 |
| 7,454,071 B2 | 11/2008 | Howard |
| 8,472,729 B2 | 6/2013 | Howard |
| 8,755,616 B2 | 6/2014 | Howard |
| 8,805,099 B2 | 8/2014 | Sasai et al. |

(Continued)

OTHER PUBLICATIONS

Sole, et. al., Transform Coefficient Coding in HEVC, Dec. 2012, IEEE Transactions on Circuits and Systems for Video Technology, vol. 22, No. 12, 1765-1775 (Year: 2012).*

(Continued)

*Primary Examiner* — Francis Geroleo
*Assistant Examiner* — Christopher Kingsbury Glover
(74) *Attorney, Agent, or Firm* — Edell, Shapiro & Finnan, LLC (57) ABSTRACT

An encoder obtains an uncompressed video bitstream that includes syntax elements that are to be coded using multi-symbol alphabets such that at least one syntax element of the syntax elements that are to be coded determines a magnitude token level that is at least partially represented by a head part. For each of the at least one syntax element, the encoder encodes the head part using multi-symbol alphabets to include a magnitude token level and end-of-block (EOB) information. The encoder transmits to a decoder an encoded bitstream that includes syntax elements coded with the multi-symbol alphabets.

20 Claims, 6 Drawing Sheets

(56) References Cited

U.S. PATENT DOCUMENTS 9,049,421 B2 6/2015 Howard
2008/0048894 A1* 2/2008 Ridge .................. H04N 19/13
341/67
2015/0245067 A1 8/2015 Howard

OTHER PUBLICATIONS

Y. Cho, "Applying PVQ Outside Daala", draft-cho-netvc-applypvq-03, NETVC (Internet Video Codec), Internet-Draft, Nov. 14, 2016, 10 pages.
P. Howard, et al., "Practical Implementations of Arithmetic Coding", Brown University, Department of Computer Science, Technical Report No. 92-18, Revised version, Apr. 1992, (Formerly Technical Report No. CS-91-45), Appears in "Image and Text Compression", James A. Storer, ed., Kluwer Academic Publishers, Norwell, MA, 1992, pp. 85-112.
A. Grange, et al., "VP9 Bitstream & Decoding Process Specification", Version 0.6, Mar. 31, 2016, pp. 1-100.
A. Grange, et al., "VP9 Bitstream & Decoding Process Specification", Version 0.6, Mar. 31, 2016, pp. 101-171.

* cited by examiner

ADAPTIVE MULTI-SYMBOL ARITHMETIC CODING USING MULTI-SYMBOL ALPHABETS INCLUDING MAGNITUDE TOKEN LEVELS AND END-OF-BLOCK (EOB)

PRIORITY CLAIM

This application claims priority to U.S. Provisional Patent Application No. 62/431,537, filed Dec. 8, 2016, the entirety of which is incorporated herein by reference.

TECHNICAL FIELD

The present disclosure relates to image and video compression.

BACKGROUND

Current entropy coding techniques based on non-adaptive or frame-adaptive statistics can be inefficient, especially for error-resilient operation. To achieve good coding performance a large number of probabilities are explicitly signaled in frame headers. This is costly, and is still more costly if independent sub-frame transmission (such as slices or tiles) is used, as these probabilities are provided for each sub-frame element.

Even with explicit and implicit frame-based adaptation, there is room for coding gain by adapting symbol-by-symbol.

DESCRIPTION OF EXAMPLE EMBODIMENTS

Overview

In one embodiment, a method is provided that is performed at a video encoder. The method involves obtaining an uncompressed video bitstream that includes syntax elements that are to be coded using multi-symbol alphabets such that at least one syntax element of the syntax elements that are to be coded determines a magnitude token level that is at least partially represented by a head part; for each of said at least one syntax element, coding the head part using multi-symbol alphabets to include a magnitude token level and end-of-block information; and transmitting to a decoder an encoded bitstream that includes syntax elements coded with the multi-symbol alphabets.

In another embodiment, a method is provided that is performed at a video decoder. The method involves receiving an encoded video bitstream that includes at least one syntax element coded using multi-symbol alphabets such that the at least one syntax element determines a magnitude token level that is at least partially represented by a head part; and for each of said at least one syntax element, decoding the head part to obtain the magnitude token level and end-of-block information.

Detailed Description

Presented herein are techniques for coding non-binary syntax elements, including coefficients, in video coding by using a symbol-adaptive multi-symbol arithmetic code. Context-adaptive techniques are used together with multi-symbol alphabets. These techniques achieve coding gain, reduce or eliminate the deficit of error-resilient versus non-error resilient coding (currently up to 10% at low rates for some systems, etc.), and eliminate the need for a compressed header providing explicit probability updates, and reduce the symbol throughput in entropy coding.

These techniques are particularly relevant to reducing the overhead of error-resilient operation in video codecs. In error-resilient operation, it is desirable to be able to parse a frame even if prior frames in the bitstream have not been received correctly due to losses and errors, and also even if the current frame depends (for example, by motion compensated prediction) upon frames that have been lost or imperfectly received. In some cases it is then possible to produce a plausible synthetic frame by making use of the parsed data (for example, motion vectors). This is not possible if the frame cannot be parsed, and so the entropy coding state is explicitly signalled to the decoder for such frames.

When using arithmetic coding as the entropy coding method, the signalling of entropy coding state may take the form of an index indicating which of a set of default initial probabilities to use, or alternatively or additionally, "forward updates" consisting of explicit probabilities to be used for contexts in the frame. Where the frame statistics differ substantially from any of the default initial probabilities, the forward updates are necessarily large in terms of bits consumed.

When error resilience is not used, entropy coding state may be inherited or adapted from previously transmitted frames. However, fixed probabilities within a frame may still cause efficiency losses due to statistical variation within the frame itself. Coding inefficiency arises whenever true probabilities of syntax elements differ from those used in the arithmetic coding scheme for coding that syntax element.

If sub-frame coding structures (like slices) are used, then these headers are used for each sub-frame coding structure and the overhead is even greater.

Current video codec technologies such as AVC/H.264, HEVC/H.265 and VP8/VP9 use a binary arithmetic coder to encode both binary values and non-binary values: non-binary values are converted to strings of binary values by some method of binarization. Binarization techniques include variable-length codes and binary trees where terminal nodes in the tree may be mapped to each value.

The multi-symbol arithmetic coding techniques presented herein allow for coding non-binary values directly without binarization, and also aggregating binary values into a non-binary value. Since the non-binary alphabets are larger, fewer symbols can be coded which reduces the demands on the arithmetic encoder and decoder throughput. Symbol-bysymbol adaptation is also provided to augment non-binary symbol coding. This eliminates having to send explicit probabilities.

Multi-Value Symbols

The multi-symbol method replaces a number of syntax elements using binary values (sometimes termed flags) with multi-symbol arithmetic coding. Any multi-symbol-capable arithmetic coder can be used.

In one example, the majority of the symbols replaced are originally multi-valued symbols coded using binary trees, and these are converted to be coded directly. In some cases, notably coefficient coding, a number of binary flags may be combined to form multi-value symbols.

Binary symbols are still coded in the bitstream, and are interleaved with the non-binary symbols and coded with the same underlying entropy coding engine, since a binary alphabet is a special case of a multi-symbol alphabet with alphabet size equal to 2.

Context Adaptation

One known adaptation for binary arithmetic coding is frame-based and uses two mechanisms: forward adaptation, through explicit signalling of probabilities in the frame header; and backward adaptation, which is an implicit process of updating probabilities after decoding each frame, based on the counts of received symbols. Backward adaptation is allowed if a frame is coded in non-resilient mode as it introduces a dependency between frames in addition to motion compensation.

The multi-value symbol technique does not change how binary symbols are adapted. It also adapts multi-value symbols by converting them back to binary flags and trees and updating their probabilities using the two legacy binary update mechanisms.

Context adaptation is a subset of the multi-value symbol technique, and adds symbol-by-symbol adaptation, to multi-symbol values only. It also eliminates the forward adaptation of these multi-value symbols. Backward adaptation still occurs, when allowed, but is applied to the initial probability tables. Multi-symbol probabilities continue to evolve from that point.

According to the techniques presented herein, individual coefficients are coded using level value tokens and remainders ("extra bits"). Small values (<5) have no extra bits. The level value tokens are (for 8 bit coding):

ZERO_TOKEN—value is 0
ONE_TOKEN—magnitude is 1
TWO_TOKEN—magnitude is 2
THREE_TOKEN—magnitude is 3
FOUR_TOKEN—magnitude is 4
CATEGORY1_TOKEN—magnitude is 5-6 (one extra bit)
CATEGORY2_TOKEN—magnitude is 7-10 (2 extra bits)
CATEGORY3_TOKEN—magnitude is 11-18 (3 extra bits)
CATEGORY4_TOKEN—magnitude is 19-34 (4 extra bits)
CATEGORY5_TOKEN—magnitude is 35-66 (5 extra bits)
CATEGORY6_TOKEN—magnitude is 67+(6 or more extra bits)

The level token values are coded as sequences of binary values by using a binary tree and a binary arithmetic encoder, and decoding consists of decoding the binary values in order and traversing the binary tree to a terminal node which is identified with a token value.

The extra bits are coded directly as non-adaptive binary flags.

The magnitude token level of the symbol is not the same as the magnitude. Again, it is the number of levels with gaps between them and extra bits can be used (and sent from an encoder to a decoder) to indicate exactly which value it is.

The end-of-block (EOB) symbol is "wrapped" into the magnitude level. The magnitude level is split into two parts: a head part and a tail part. The head part is where the EOB coding occurs, and in general, is used for a small value. When decoding the head part, it is a multi-value symbol (not binary) and it indicates whether the value is zero, 1, or 2 (or more) and whether it is the last value in the block (EOB or non-EOB (NEOB)).

In a further modification, a BLOCK_ZERO flag may also be combined with the head part for the first coefficient position. The BLOCK_ZERO value indicates whether the whole block is zero or not. If this value is decoded, then no further data is decoded for the block.

Thus, a method is presented herein that involve performing coefficient coding and decoding to use multi-symbol arithmetic coding. It involves apportioning the token level and EOB information into "head" and "tail" multi-symbol alphabets.

The head part is a multi-valued symbol (not binary) and indicates whether the value is zero, 1 or 2 or more, and also whether it is the last non-zero value in the block (EOB). Thus, in one embodiment, there are five values: zero, 1-EOB, 1 not-EOB (NEOB), 2 or more EOB and 2 or more NEOB (zero cannot be the EOB). The tail part codes the remaining token value possibilities. If the BLOCK_ZERO value is included, then there are six values: BLOCK_ZERO<zero, 1-EOB, 1 not-EOB (NEOB), 2 or more EOB and 2 or more NEOB.

It can be seen that the head part could easily indicate either a smaller (for example, zero or non-zero only) or larger (for example, 0, 1, 2, or 3 or more) range of values, but in combination with the EOB/NEOB option will form an odd number of symbol possibilities, except for the first coefficient, where including BLOCK_ZERO will make an even number of symbol possibilities.

The improved coefficient decoding process modifies the above "token decoding" process in the following ways:

1) Level codes are coded in two parts, a head and a tail. In one embodiment, the head part is an initial 5-value symbol, covering small values, and the tail part is a conditional 9-value symbol.
2) Each block of transform coefficients has a BLOCK_ZERO flag indicating if all values are zero or not. This is equivalent to the first more_coefs syntax element in the old system. This may also be included in the head part of the first (DC) coefficient to make a 6-value symbol.
3) There are no remaining more_coefs flags as their function is absorbed into the token head.

The extra bits are coded as non-adaptive binary flags with fixed probabilities as before.

Figure 1:
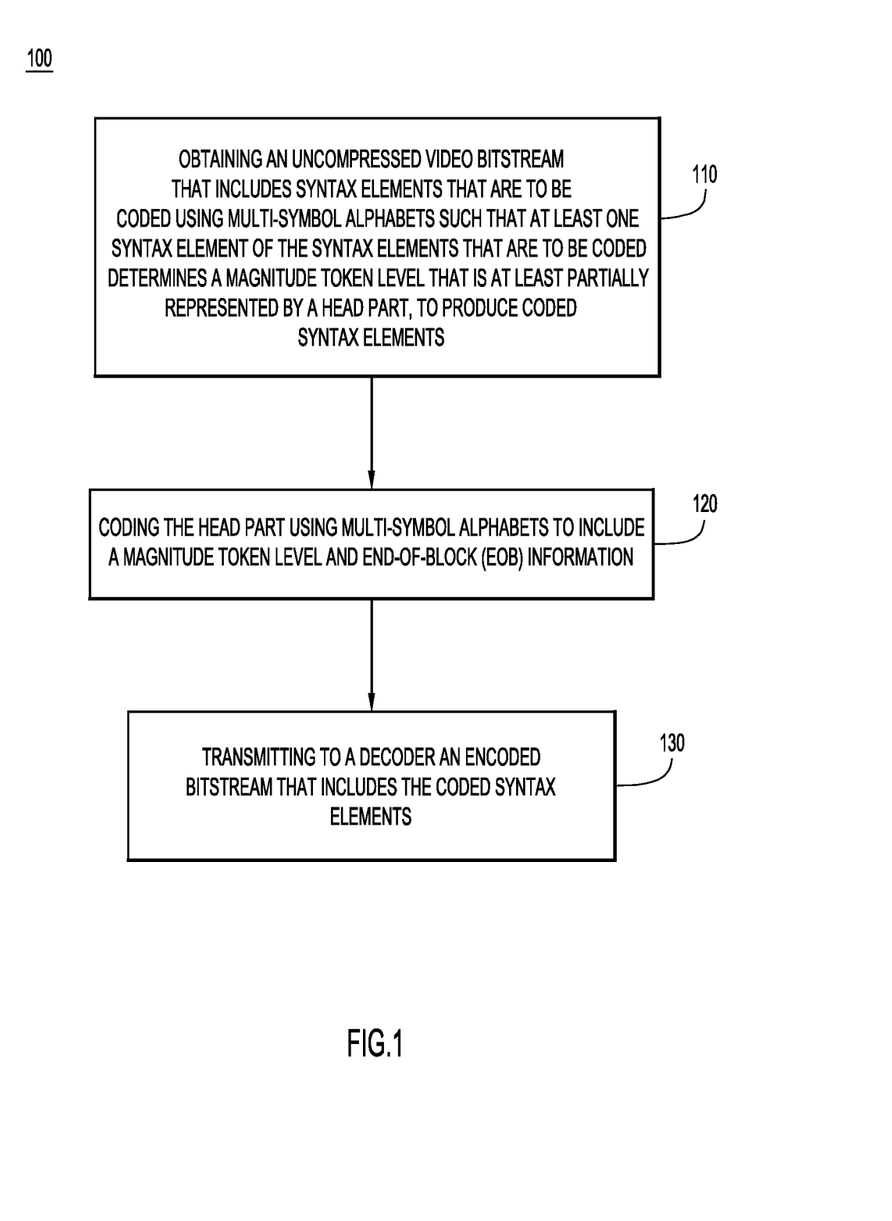
FIG. 1 is a high-level flow chart of an arithmetic coding process according to an example embodiment.
Figure 2:
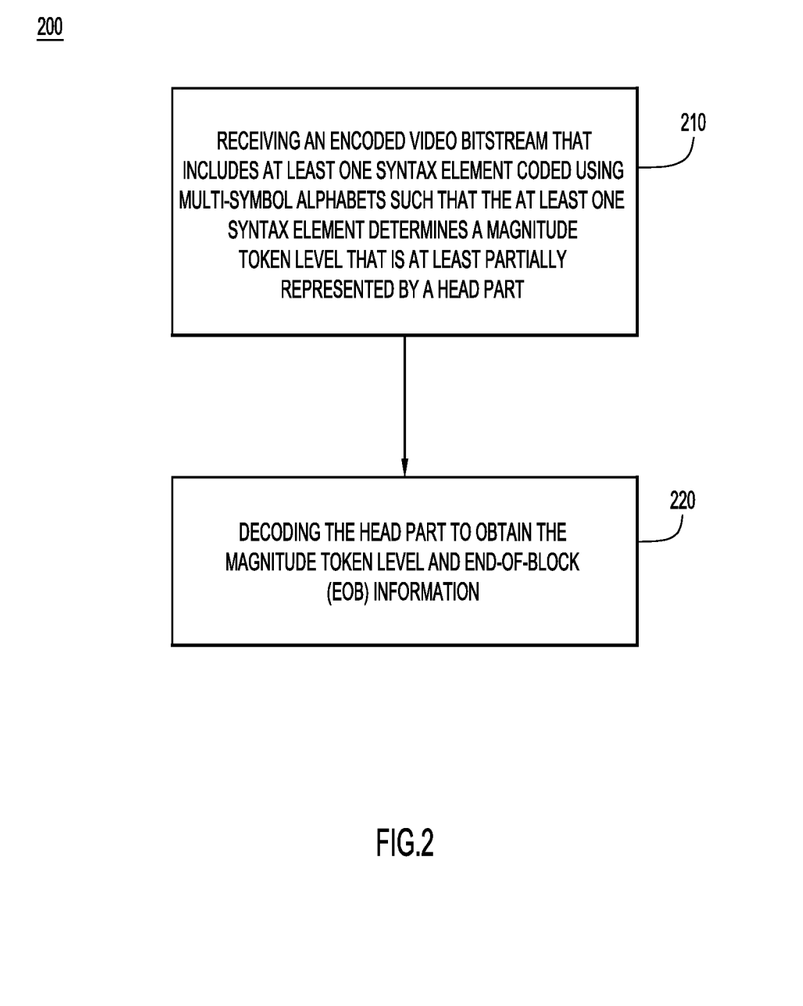
FIG. 2 is a high-level flow chart of an arithmetic decoding process according to an example embodiment.

FIG. 1 is a high-level flow chart of a process performed at an encoder, according to an example embodiment. FIG. 2 is a high-level flow chart of a process performed at a decoder, according to an example embodiment. A more detailed description of the coding and decoding process is described hereinafter in connection with FIG. 3.

Referring now to FIG. 1, the high-level flow chart for a process 100 performed at an encoder is now described. At 110, an uncompressed video bitstream is obtained that includes syntax elements that are to be coded using multi-symbol alphabets such that at least one syntax element of the syntax elements that are to be coded determines a magnitude token level that is at least partially represented by a head part. At 120, for each of the at least one syntax element, the head part is coded using multi-symbol alphabets to include a magnitude token level and EOB information. At 130, the encoder transmits to a decoder an encoded bitstream that includes syntax elements coded with the multi-symbol alphabets.

Turning now to FIG. 2, the high-level flow chart for a process 200 performed at a decoder is now described. At 210, the decoder receives an encoded video bitstream that includes at least one syntax element coded using multi-symbol alphabets such that the at least one syntax element determines a magnitude token level that is at least partially represented by a head part. At 220, for each of the at least one syntax element, the decoder decodes the head part to obtain the magnitude token level and the EOB information.

As explained in more detail below, the magnitude token level is further represented by a tail part, and coding may include coding the tail part with remaining token level possibilities not represented by the head part. Thus, coding may include coding coding the head part with a first multi-valued symbol covering relatively smaller values and coding the tail part with a second multi-valued symbol.

In addition, the magnitude token level may indicate a range of magnitude levels, and the coding may include coding a symbol value within a range of magnitude token levels using further syntax elements. A sign of a symbol value may be encoded with a sign bit.

The head part may be coded with an odd-number value symbol, such as 3-value symbol or a 5-value symbol.

The at least one syntax element may be a non-binary values and in one example, it is a transform coefficient.

In one example embodiment, possible values of the token head symbol are:

0=ZERO_TOKEN

1=ONE_TOKEN_EOB

2=ONE_TOKEN_NEOB

3=TWO_PLUS_TOKEN_EOB

4=TWO_PLUS_TOKEN_NEOB where EOB denotes this is the last non-zero value, and NEOB denotes this is not the last non-zero value. The block coefficients cannot end with a zero value. In other words, the head part is a multi-valued symbol that indicates whether the token level value is "zero", "1-EOB", "1-NEOB", "2 or more EOB" or "2 or more NEOB", where EOB is end-of-block indicating the last non-zero value in the block and NEOB is not end-of-block indicating it is not the last non-zero value in the block, and "2 or more" indicates that the value is at least 2.

In another example embodiment, the head part of a first coefficient is augmented with a BLOCK_ZERO value and the possible values are:

0=BLOCK_ZERO

1=ZERO_TOKEN

2=ONE_TOKEN_EOB

3=ONE_TOKEN_NEOB

4=TWO_PLUS_TOKEN_EOB

5=TWO_PLUS_TOKEN_NEOB

If the value decoded is TWO_PLUS_TOKEN_EOB or TWO_PLUS_TOKEN_NEOB then the rest of the token value is decoded in the token tail symbol which covers the values: TWO_TOKEN, THREE_TOKEN, FOUR_TOKEN, CATEGORY1_TOKEN, CATEGORY2_TOKEN, CATEGORY3_TOKEN, CATEGORY4_TOKEN, CATEGORY5_TOKEN, CATEGORY6_TOKEN In one example embodiment, the full syntax is shown below:

| | Type |
|---|---|
| tokens( plane, startX, startY, txSz, blockIdx ) {<br>  segEob = 16 << (txSz << 1)<br>  scan = get_scan( plane, txSz, blockIdx )<br>  block_zero<br>  is_eob = block_zero<br>  for( c = 0; c < segEob && !is_eob; c++) {<br>    pos = scan[ c ]<br>    band = (txSz == TX_4X4) ? coefband_4x4[ c ]<br>    :<br>    coefband_8x8plus[ c ] | T |
|     token_head<br>    token = (token_head + 1) >> 1<br>    is_eob = token_head & 1<br>    if ( token >= TWO_TOKEN ) { | MS |
|       token_tail<br>      token += token_tail<br>    }<br>    TokenCache[ pos ] = energy_class[ token]<br>    if ( token == ZERO_TOKEN ) {<br>      Tokens[ pos ] = 0<br>    } else {<br>      coef = read_coef( token ) | MS |
|       sign_bit<br>      Tokens[ pos ] = sign_bit ? -coef : coef<br>    }<br>  }<br>  for ( i = c; i < segEob; i++ )<br>    Tokens[ scan[ i ] ] = 0<br>  return (block_zero != 0)<br>} | L(1) |

Where the block_zero flag is included in the first head element, the full syntax is shown below:

| | Type |
|---|---|
| tokens( plane, startX, startY, txSz, blockIdx ) {<br>  segEob = 16 << (txSz << 1)<br>  scan = get_scan( plane, txSz, blockIdx )<br>  block_zero = 0<br>  for( c = 0; c < segEob && !is_eob; c++) {<br>    pos = scan[ c ]<br>    band = (txSz == TX_4X4) ? coefband_4x4[ c ]<br>    :<br>    coefband_8x8plus[ c ] | |
|     token_head<br>    if (c==0) {<br>      block_zero = (token == 0)<br>      if (block_zero == 1) {<br>        break<br>      }<br>      token_head = token_head − 1<br>    }<br>    token = (token_head + 1) >> 1<br>    is_eob = token_head & 1<br>    if ( token >= TWO_TOKEN ) { | MS |
|       token_tail<br>      token += token_tail<br>    }<br>    TokenCache[ pos ] = energy_class[ token]<br>    if ( token == ZERO_TOKEN ) {<br>      Tokens[ pos ] = 0<br>    } else {<br>      coef = read_coef( token)<br>      sign_bit<br>      Tokens[ pos ] = sign_bit ? -coef : coef<br>    }<br>  }<br>  for ( i = c; i < segEob; i++ )<br>    Tokens[ scan] i ] ] = 0<br>  return (block_zero != 0)<br>} | MS<br><br><br><br><br><br><br><br>L(1) |

Figure 3:
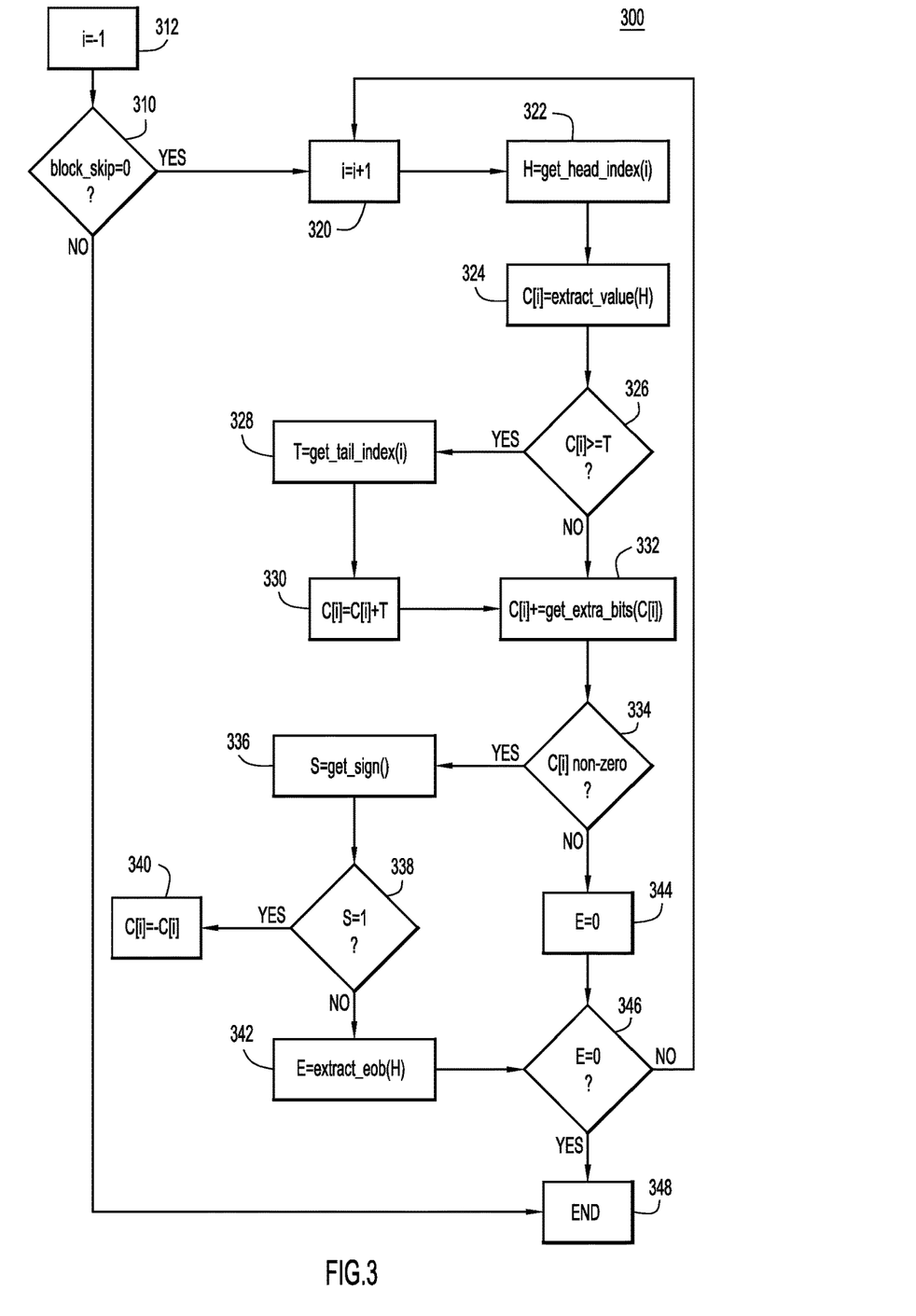
FIG. 3 is a detailed flow chart of a process used in the arithmetic coding and decoding processes, according to an example embodiment.

Reference is now made to FIG. 3 for a more detailed description of a process 300 performed at an encoder and decoder based on the first syntax provided above, according to an example embodiment. A coefficient index is i in scan order. The functions that read values from the bitstream are:

get_head_index
get_tail_index
get_extra_bits
get_sign get_head_index( ) and get_tail_index( ) together obtain a magnitude index. This is not the magnitude of the coefficient but a mapping into a set of magnitude levels, for example: 0→0, 1→1, 2→2, 3→3, 4→4, 5→5, 6→7, 7→11, 8→19, 9→35, 10→67. In one example embodiment, the gaps between levels would be non-decreasing powers of 2.

At 310, it is determined whether block_skip is zero. If it is zero, then at 320, the coefficient index i is incremented. If block_skip is not zero, then at 312 the index i is set to 1.

At 322, the head index (H=get_head_index(i)) is obtained, and at 324, from that index, the magnitude level value that is represented is extracted (C(i)=extract_value (H)), i.e., whether it is 0, 1 or 2 or more. At 326, the extracted value is compared with an arbitrary threshold T, for example, 2. If the threshold T is exceeded, then at 328, the tail is obtained, which is the next of the magnitude level and that is added in at 330. For example, if coding the value of "10", a value of 2 would be coded in the head and a value of 8 would be coded for the tail (the remainder).

Then, at 332, a lookup is made to determine how many extra bits are needed (C(i)+=get_extra_bits(C(i)). The extra bits determine the magnitude level value within each magnitude level set. There may be no extra bits if there is only one value for each level. For larger values, there may be 1, 2, 3 or 4 extra bits.

At 334, if it is determined that C(i) is non-zero, then the sign bit S is obtained at 336. At 338, it is determined whether S is equal to 1. If it is equal to 1, then C(i) is updated at 340, and at 342, the EOB indicator E is obtained as a function of the head part H.

At 334, if it is determined that C(i) is not non-zero, then at 344, E is set equal to zero. Thus, at 346, it is determined whether E is equal to zero, and if so, the process ends at 348 because the EOB has truly been reached. Otherwise, the process repeats at 320 as shown in FIG. 1 to increment the index i.

The sign bit S and the extra bits are binary coded with fixed binary probabilities per frame or slice. The magnitude indices are coded as non-binary symbols which can be adapted per symbol. The EOB indicator is wrapped into the head index, so T+1 possible indices become 2*T+1 values, with zero, T EOB combined codes and T Non-EOB combined codes.

The various values be contextualized on the basis of previously encoded values.

As a variation of the above method the block skip flags for corresponding blocks of each video component (Y, U and V or perhaps R, G and B) may also be combined into a single multi-valued symbol and coded using a multi-symbol arithmetic encoder.

As still a further variation of the above method, the block skip flag may also be combined into the Head symbol to form an alphabet of the form: {BLOCK_SKIP, 0, 1-EOB, 1-NEOB, 2-PLUS-EOB, 2-PLUS-NEOB}. The BLOCK_SKIP element could be included for the first value in the block (as only one is needed per block) or could be included for all values but given zero or minimal probability for subsequent values in the block.

There are a number of other integer-valued syntax elements which can be directly converted to multi-symbol coding. These include:

1. Intra prediction mode—there are 10 basic prediction modes.
2. Motion vectors: divided into a 4-valued joint code signalling whether vertical and horizontal components are zero, and a magnitude code analogous to coefficient token coding
3. Transform size
4. Interpolation filter choice
5. Partition choice (no split, vertical, horizontal or quad split)

Figure 4:
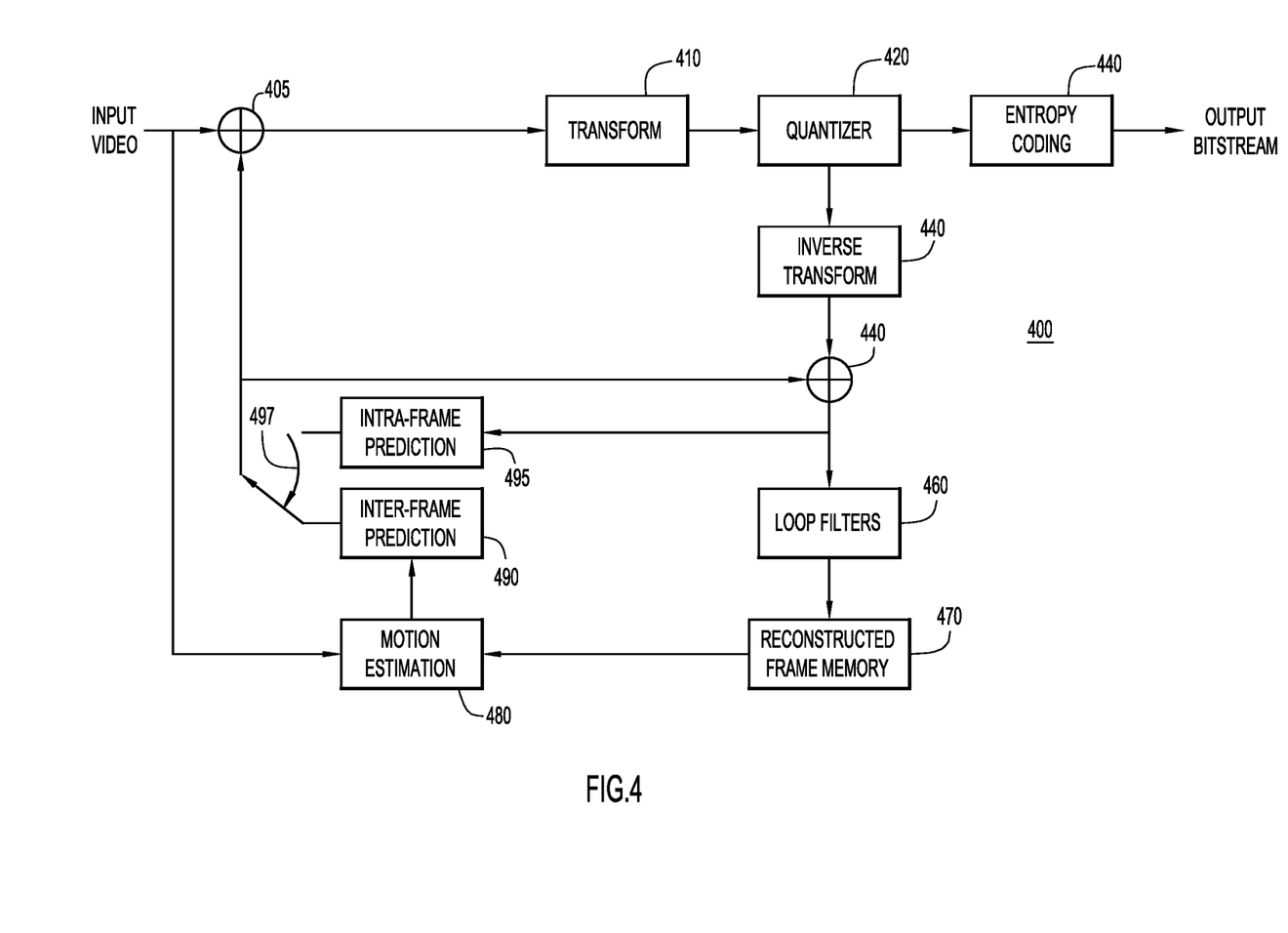
FIG. 4 is a block diagram of an encoder configured to perform the arithmetic coding process, according to an example embodiment.

Referring to FIG. 4, a block diagram of a video encoder is shown at reference numeral 100. The video encoder 400 is configured to perform the arithmetic coding techniques presented herein. The video encoder 400 includes a subtractor 405, a transform unit 410, a quantizer unit 420, an entropy coding unit 430, an inverse transform unit 440, an adder 450, one or more loop filters 460, a reconstructed frame memory 470, a motion estimation unit 480, an inter-frame prediction unit 490, an intra-frame prediction unit 495 and a switch 497.

A current frame (input video) as well as a prediction frame are input to a subtractor 405. The subtractor 405 is provided with input from either the inter-frame prediction unit 490 or intra-frame prediction unit 495, the selection of which is controlled by switch 497. Intra-prediction processing is selected for finding similarities within the current image frame, and is thus referred to as "intra" prediction. Motion compensation has a temporal component and thus involves analysis between successive frames that is referred to as "inter" prediction. The motion estimation unit 480 supplies a motion estimation output as input to the inter-frame prediction unit 490. The motion estimation unit 480 receives as input the input video and an output of the reconstructed frame memory 470.

The subtractor 405 subtracts the output of the switch 497 from the pixels of the current frame, prior to being subjected to a two dimensional transform process by the transform unit 410 to produce transform coefficients. The transform coefficients are then subjected to quantization by quantizer unit 420 and then supplied to entropy coding unit 430. Entropy coding unit 430 applies entropy encoding in order to remove redundancies without losing information, and is referred to as a lossless encoding process. The entropy coding unit 430 is configured to perform the arithmetic coding techniques described herein. Subsequently, the encoded data is arranged in network packets via a packetizer (not shown), prior to be transmitted in an output bit stream.

The output of the quantizer unit 420 is also applied to the inverse transform unit 440 and used for assisting in prediction processing. The adder 450 adds the output of the inverse transform unit 440 and an output of the switch 497 (either the output of the inter-frame prediction unit 190 or the intra-frame prediction unit 495). The output of the adder 450 is supplied to the input of the intra-frame prediction unit 495 and to one or more loop filters 460 which suppress some of the sharpness in the edges to improve clarity and better support prediction processing. The output of the loop filters 460 is applied to a reconstructed frame memory 470 that holds the processed image pixel data in memory for use in subsequent motion processing by motion estimation block 480.

Figure 5:
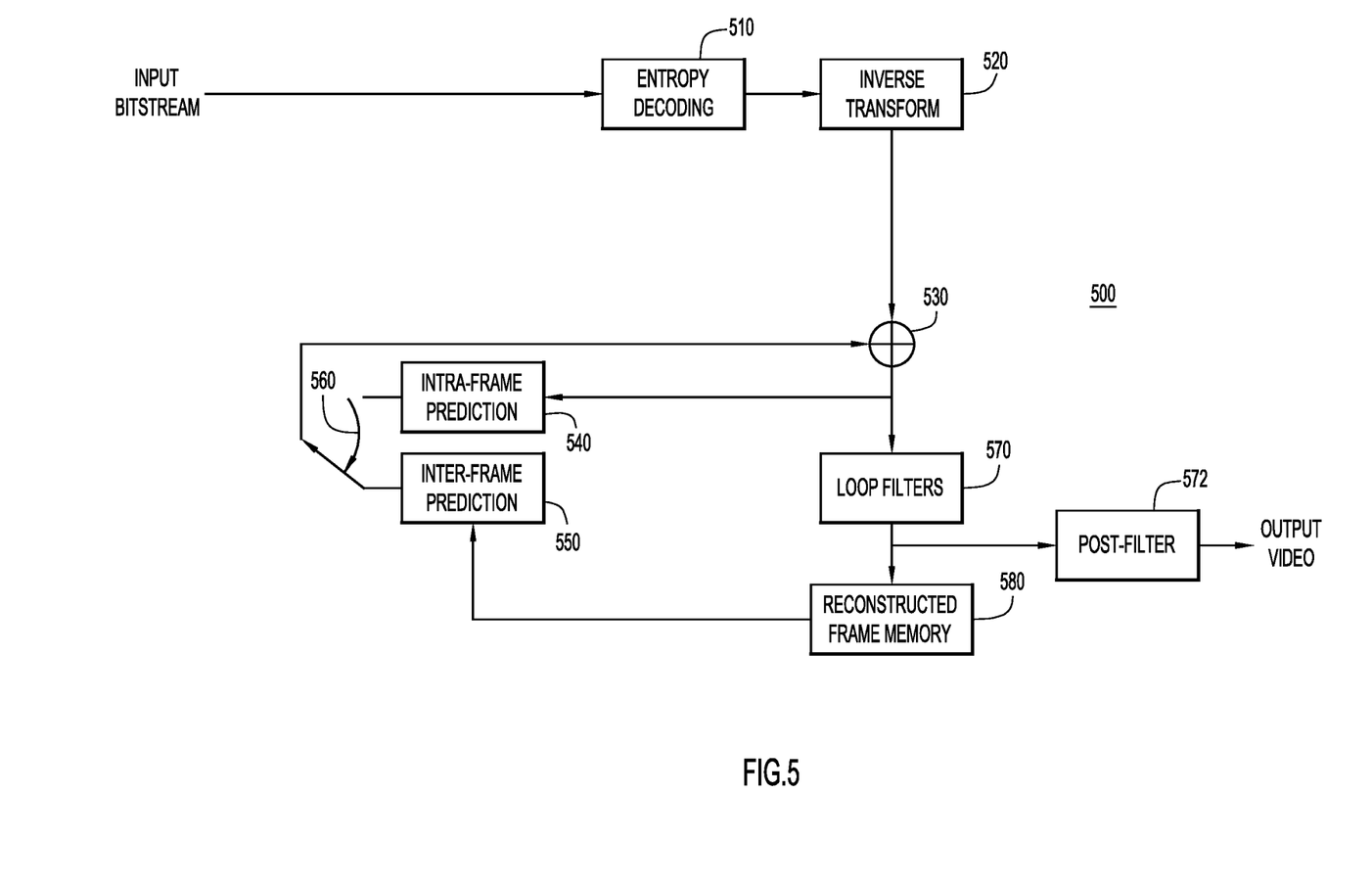
FIG. 5 is a block diagram of a decoder configured to perform the arithmetic decoding process, according to an example embodiment.

Turning to FIG. 5, a block diagram of a video decoder is shown at reference numeral 200. The video decoder 500 includes an entropy decoding unit 510, an inverse transform unit 520, an adder 530, an intra-frame prediction unit 540, an inter-frame prediction unit 550, a switch 560, one or more loop filters 570 and a reconstructed frame memory 580. The entropy coding unit 510 is configured to perform the arithmetic decoding operations described herein. The order of the filters must agree with the order used in the encoder. In addition, a post-filter 572 is shown in FIG. 5. The entropy decoding unit 510 performs entropy decoding on the received input bitstream to produce quantized transform coefficients which are applied to the inverse transform unit 520. The inverse transform unit 520 applies two-dimensional inverse transformation on the quantized transform coefficients to output a quantized version of the difference samples. The output of the inverse transform unit 520 is applied to the adder 530. The adder 530 adds to the output of the inverse transform unit 520 an output of either the intra-frame prediction unit 540 or inter-frame prediction unit 550. The loop filters 570 operate similar to that of the loop filters 560 in the video encoder 400 of FIG. 4. An output video image is taken at the output of the loop filters 570.

The video encoder 400 of FIG. 4 and the video decoder 500 of FIG. 5 may be implemented by digital logic gates in an integrated circuit (e.g., by an application specific integrated circuit) or by two or more separate logic devices. Alternatively, the video encoder 400 and video decoder 500 may be implemented by software executed by one or more processors, as described further in connection with FIG. 6, below.

Each of the functional blocks in FIGS. 4 and 5 are executed for each coding block, prediction block, or transform block.

Figure 6:
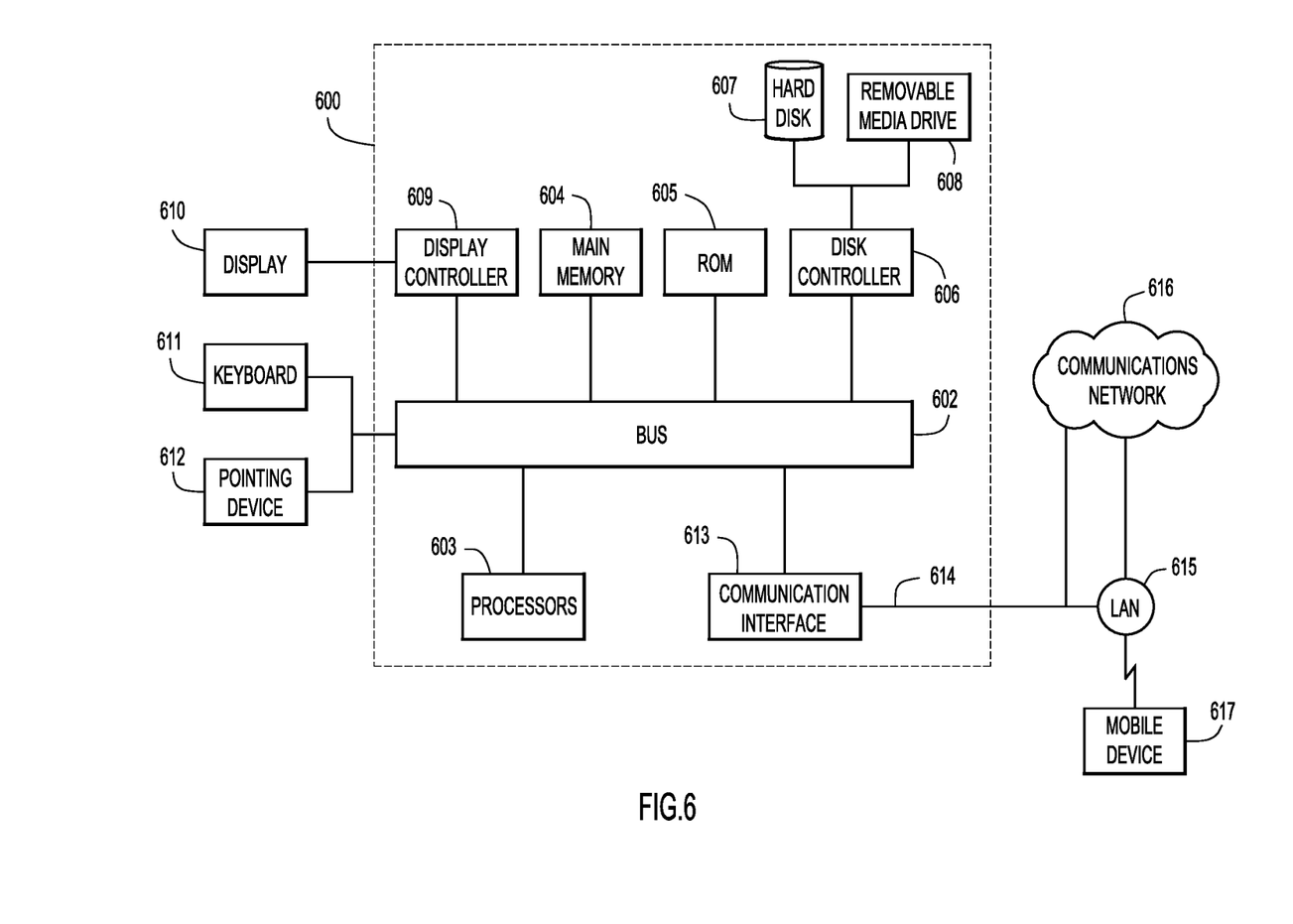
FIG. 6 is a block diagram of a computing device that may configured to perform the arithmetic coding and arithmetic decoding processes presented herein, according to an example embodiment.

FIG. 6 illustrates a computer system 600 upon which an embodiment of the present invention may be implemented. The computer system 600 may be programmed to implement a computer based device, such as a video conferencing endpoint or any device includes a video encoder or decoder for processing real time video images. The computer system 600 includes a bus 602 or other communication mechanism for communicating information, and a processor 603 coupled with the bus 602 for processing the information. While the figure shows a signal block 603 for a processor, it should be understood that the processors 603 represent a plurality of processing cores, each of which can perform separate processing. The computer system 600 also includes a main memory 604, such as a random access memory (RAM) or other dynamic storage device (e.g., dynamic RAM (DRAM), static RAM (SRAM), and synchronous DRAM (SD RAM)), coupled to the bus 602 for storing information and instructions to be executed by processor 603. In addition, the main memory 604 may be used for storing temporary variables or other intermediate information during the execution of instructions by the processor 603.

The computer system 600 further includes a read only memory (ROM) 605 or other static storage device (e.g., programmable ROM (PROM), erasable PROM (EPROM), and electrically erasable PROM (EEPROM)) coupled to the bus 602 for storing static information and instructions for the processor 603.

The computer system 600 also includes a disk controller 606 coupled to the bus 602 to control one or more storage devices for storing information and instructions, such as a magnetic hard disk 607, and a removable media drive 608 (e.g., floppy disk drive, read-only compact disc drive, read/write compact disc drive, compact disc jukebox, tape drive, and removable magneto-optical drive). The storage devices may be added to the computer system 600 using an appropriate device interface (e.g., small computer system interface (SCSI), integrated device electronics (IDE), enhanced-IDE (E-IDE), direct memory access (DMA), or ultra-DMA).

The computer system 600 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 600 may also include a display controller 609 coupled to the bus 602 to control a display 610, such as a cathode ray tube (CRT), liquid crystal display (LCD), light emitting diode (LED) display, etc., for displaying information to a computer user. The computer system 600 includes input devices, such as a keyboard 611 and a pointing device 612, for interacting with a computer user and providing information to the processor 603. The pointing device 612, for example, may be a mouse, a trackball, or a pointing stick for communicating direction information and command selections to the processor 603 and for controlling cursor movement on the display 610. In addition, a printer may provide printed listings of data stored and/or generated by the computer system 600.

The computer system 600 performs a portion or all of the processing steps of the invention in response to the processor 603 executing one or more sequences of one or more instructions contained in a memory, such as the main memory 604. Such instructions may be read into the main memory 604 from another computer readable medium, such as a hard disk 607 or a removable media drive 608. One or more processors in a multi-processing arrangement may also be employed to execute the sequences of instructions contained in main memory 604. In alternative embodiments, hard-wired circuitry may be used in place of or in combination with software instructions. Thus, embodiments are not limited to any specific combination of hardware circuitry and software.

As stated above, the computer system 600 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 600, for driving a device or devices for implementing the invention, and for enabling the computer system 600 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 600 also includes a communication interface 613 coupled to the bus 602. The communication interface 613 provides a two-way data communication coupling to a network link 614 that is connected to, for example, a local area network (LAN) 615, or to another communications network 616 such as the Internet. For example, the communication interface 613 may be a wired or wireless network interface card to attach to any packet switched (wired or wireless) LAN. As another example, the communication interface 613 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to another computer through a local area network 615 (e.g., a LAN) or through equipment operated by a service provider, which provides communication services through a communications network 616. The local network 614 and the communications network 616 use, for example, electrical, electromagnetic, or optical signals that carry digital data streams, and the associated physical layer (e.g., CAT 5 cable, coaxial cable, optical fiber, etc.). The signals through the various networks and the signals on the network link 614 and through the communication interface 613, which carry the digital data to and from the computer system 600 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 600 can transmit and receive data, including program code, through the network(s) 615 and 616, the network link 614 and the communication interface 613. Moreover, the network link 614 may provide a connection through a LAN 615 to a mobile device 617 such as a personal digital assistant (PDA) laptop computer, or cellular telephone.

Techniques are presented herein for coding non-binary syntax elements in video coding, including coefficients, by using a symbol-adaptive multi-symbol arithmetic code. Using only frame-adaptive coding, as known in the art, is inefficient and requires large headers which are a barrier to sub-frame coding where headers must be duplicated.

Variations of these techniques may include:

1) Coding a combined symbol for small values and EOB, e.g. {ZERO, NON_ZERO_EOB, NON_ZERO_NO_EOB} or {ZERO, ONE_EOB, ONE_NO_EOB, TWO_PLUS_EOB, TWO_PLUS_NEOB} etc.

2) Coding a combined symbol for small, values, EOB and BLOCK_ZERO for the first coefficient in a block, e.g. {BLOCK_ZERO, ZERO, NON_ZERO_EOB, NON_ZERO_NO_EOB} or {BLOCK_ZERO, ZERO, ONE_EOB, ONE_NO_EOB, TWO_PLUS_EOB, TWO_PLUS_NEOB} etc.

3) Coding a coefficient magnitude in three parts: a "head token" as in 1), a "tail token" covering remaining magnitude codes, and a set of extra bits for exactly specifying coefficient magnitudes.

4) Coding integer values with adaptive probability contexts, where the adaptation rate depends upon the alphabet size, and the minimum probability also depends on the alphabet size.

To summarize, in one form, a method is provided including: at an encoder, obtaining an uncompressed video bitstream that includes syntax elements that are to be coded using multi-symbol alphabets such that at least one syntax element of the syntax elements that are to be coded determines a magnitude token level that is at least partially represented by a head part; for each of said at least one syntax element, coding the head part using multi-symbol alphabets to include a magnitude token level and end-of-block (EOB) information; and transmitting to a decoder an encoded bitstream that includes syntax elements coded with the multi-symbol alphabets.

As described above, in one example, the head part is a multi-valued symbol that indicates whether a magnitude token level value is "zero", "1-EOB", "1-NEOB", "2 or more EOB" or "2 or more NEOB", where EOB is end-of-block indicating the last non-zero value in the block and NEOB is not end-of-block indicating it is not the last non-zero value in the block, and "2 or more" indicates that the value is at least 2.

The at least one syntax element may be a non-binary value, and in one example, may be a transform coefficient.

The magnitude token level may be further represented by a tail part, and wherein coding further includes coding the tail part with remaining token level possibilities not represented by the head part. Coding may further include coding the head part with a first multi-valued symbol covering relatively smaller values and coding the tail part with a second multi-valued symbol.

The magnitude token level may indicate a range of magnitude levels. In this case, coding may include coding a symbol value within a range of magnitude token levels using further syntax elements.

The coding step may further include coding a sign of a symbol value using a sign bit.

The coding step may include coding the head part with an odd-number value symbol.

Moreover, coding the head part may include coding, for a first coefficient, an indication whether a block has only zero coefficients.

In another form, a method is provided including: at a decoder, receiving an encoded video bitstream that includes at least one syntax element coded using multi-symbol alphabets such that the at least one syntax element determines a magnitude token level that is at least partially represented by a head part; and for each of said at least one syntax element, decoding the head part to obtain the magnitude token level and end-of-block (EOB) information.

Again, the magnitude token level may be further represented by a tail part, and the decoding may further include decoding the tail part to obtain remaining token level possibilities not represented by the head part.

Further, in still another form, an apparatus is provided including: a communication interface configured receive an encoded video bitstream transmitted from an encoder, the encoded video bitstream including at least one syntax element coded using multi-symbol alphabets such that the at least one syntax element determines a magnitude token level that is at least partially represented by a head part; and a processor coupled to the communication interface, and configured to, for each of said at least one syntax element, decode the head part to obtain the magnitude token level and end-of-block (EOB) information.

In yet another form, an apparatus is provided including: a communication interface; and a processor coupled to the communication interface, and configured to: obtain an uncompressed video bitstream that includes syntax elements that are to be coded using multi-symbol alphabets such that at least one syntax element of the syntax elements that are to be coded determines a magnitude token level that is at least partially represented by a head part; for each of said at least one syntax element, encode the head part using multi-symbol alphabets to include a magnitude token level and end-of-block (EOB) information; and cause the communication interface to transmit to a decoder an encoded bitstream that includes syntax elements coded with the multi-symbol alphabets.

In still another embodiment, a non-transitory computer readable storage media is provided that is encoded with instructions which, when executed by at least one processor of a video encoder, cause the processor to: obtain an uncompressed video bitstream that includes syntax elements that are to be coded using multi-symbol alphabets such that at least one syntax element of the syntax elements that are to be coded determines a magnitude token level that is at least partially represented by a head part; for each of said at least one syntax element, code the head part using multi-symbol alphabets to include a magnitude token level and end-of-block (EOB) information; cause to be transmitted to a decoder an encoded bitstream that includes syntax elements coded with the multi-symbol alphabets.

In yet another form, a non-transitory computer readable storage media is provided that is encoded with instructions which, when executed by at least one processor of a video decoder, cause the processor to: receive an encoded video bitstream that includes at least one syntax element coded using multi-symbol alphabets such that the at least one syntax element determines a magnitude token level that is at least partially represented by a head part; and for each of said at least one syntax element, decode the head part to obtain the magnitude token level and end-of-block (EOB) information.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising: at an encoder, obtaining an uncompressed video bitstream that includes syntax elements that are to be coded using multi-symbol alphabets such that at least one syntax element of the syntax elements that are to be coded determines a magnitude token level that is split into a head part and a tail part, wherein the head part is expressed as a symbol and has a smaller magnitude value relative to a magnitude value of the tail part; for each of said at least one syntax element: coding the head part using multi-symbol alphabets to include a first multivalued symbol covering a magnitude token level, and either an end-of-block (EOB) or a not-EOB (NEOB) coded into the magnitude token level, such that the magnitude token level indicates a value and whether the value is a last non-zero value for a block or is not the last non-zero value for the block, wherein the coding includes coding the value as a first magnitude token level when the value is the EOB and coding the value as a second magnitude token level different from the first magnitude token level when the value is the NEOB to provide a set of magnitude token levels representing the value and both the EOB and the NEOB for transmission; and coding the tail part with a second multivalued symbol covering remaining magnitude token level possibilities not represented by the head part when the value is not the last non-zero value for the block; and transmitting to a decoder an encoded bitstream that includes syntax elements coded with the multi-symbol alphabets.

2. The method of claim 1 wherein the magnitude token level indicates a range of magnitude levels.

3. The method of claim 1, wherein coding includes coding a symbol value within a range of magnitude token levels using further syntax elements.

4. The method of claim 1, wherein coding further includes coding a sign of a symbol value using a sign bit.

5. The method of claim 1, wherein coding includes coding the head part with an odd-number value symbol.

6. The method of claim 1, wherein coding the head part includes coding, for a first coefficient, an indication whether a block has only zero coefficients.

7. The method of claim 1, wherein the head part is a multi-valued symbol that indicates whether a magnitude token level value is "zero", "1-EOB", "1-NEOB", "2 or more EOB" or "2 or more NEOB", where "2 or more" indicates that the value is at least 2.

8. The method of claim 1, wherein the at least one syntax element is a non-binary value.

9. The method of claim 1, wherein the at least one syntax element is a transform coefficient.

10. A method comprising: at a decoder, receiving an encoded video bitstream that includes at least one syntax element coded using multi-symbol alphabets such that the at least one syntax element determines a magnitude token level that is split into a head part and a tail part, wherein the head part is expressed as a symbol and has a smaller magnitude value relative to a magnitude value of the tail part and wherein for each of said at least one syntax element: the head part is coded using multi-symbol alphabets to include a first multivalued symbol covering a magnitude token level, and either an end-of-block (EOB) or a not-EOB (NEOB) coded into the magnitude token level, such that the magnitude token level indicates a value and whether the value is a last non-zero value for a block or is not the last non-zero value for the block, and such that the value is coded as a first magnitude token level when the value is the EOB and the value is coded as a second magnitude token level different from the first magnitude token level when the value is the NEOB to provide a set of magnitude token levels representing the value and both the EOB and the NEOB for transmission; and the tail part is coded with a second multivalued symbol covering remaining magnitude token level possibilities not represented by the head part when the value is not the last non-zero value for the block; and for each of said at least one syntax element, decoding the head part to obtain the magnitude token level and end-of-block (EOB) information.

11. The method of claim 10, wherein decoding further includes decoding the tail part to obtain remaining token level possibilities not represented by the head part.

12. The method of claim 10, wherein the magnitude token level indicates a range of magnitude levels.

13. The method of claim 10, wherein the head part is coded with an odd-number value symbol.

14. The method of claim 10, wherein the head part is a multi-valued symbol that indicates whether a magnitude token level value is "zero", "1-EOB", "1-NEOB", "2 or more EOB" or "2 or more NEOB", where "2 or more" indicates that the value is at least 2.

15. An apparatus comprising: a communication interface configured receive an encoded video bitstream transmitted from an encoder, the encoded video bitstream including at least one syntax element coded using multi-symbol alphabets such that the at least one syntax element determines a magnitude token level that is split into a head part and a tail part, wherein the head part is expressed as a symbol and has a smaller magnitude value relative to a magnitude value of the tail part and wherein for each of said at least one syntax element: the head part is coded using multi-symbol alphabets to include a first multivalued symbol covering a magnitude token level, and either an end-of-block (EOB) or a not-EOB (NEOB) coded into the magnitude token level, such that the magnitude token level indicates a value and whether the value is a last non-zero value for a block or is not the last non-zero value for the block, and such that the value is coded as a first magnitude token level when the value is the EOB and the value is coded as a second magnitude token level different from the first magnitude token level when the value is the NEOB to provide a set of magnitude token levels representing the value and both the EOB and the NEOB for transmission; and the tail part is coded with a second multivalued symbol covering remaining magnitude token level possibilities not represented by the head part when the value is not the last non-zero value for the block; and a processor coupled to the communication interface, and configured to, for each of said at least one syntax element, decode the head part to obtain the magnitude token level and end-of-block (EOB) information.

16. The apparatus of claim 15, wherein the processor is configured to decode the tail part to obtain remaining magnitude token level possibilities not represented by the head part.

17. The apparatus of claim 15, wherein the head part is coded with an odd-number value symbol.

18. The apparatus of claim 15, wherein the magnitude token level indicates a range of magnitude levels.

19. The apparatus of claim 15, wherein the head part is a multi-valued symbol that indicates whether a magnitude token level value is "zero", "1-EOB", "1-NEOB", "2 or more EOB" or "2 or more NEOB", where "2 or more" indicates that the value is at least 2.

20. The apparatus of claim 15, wherein the at least one syntax element is a transform coefficient.

* * * * *